UNITED STATES PATENT OFFICE.

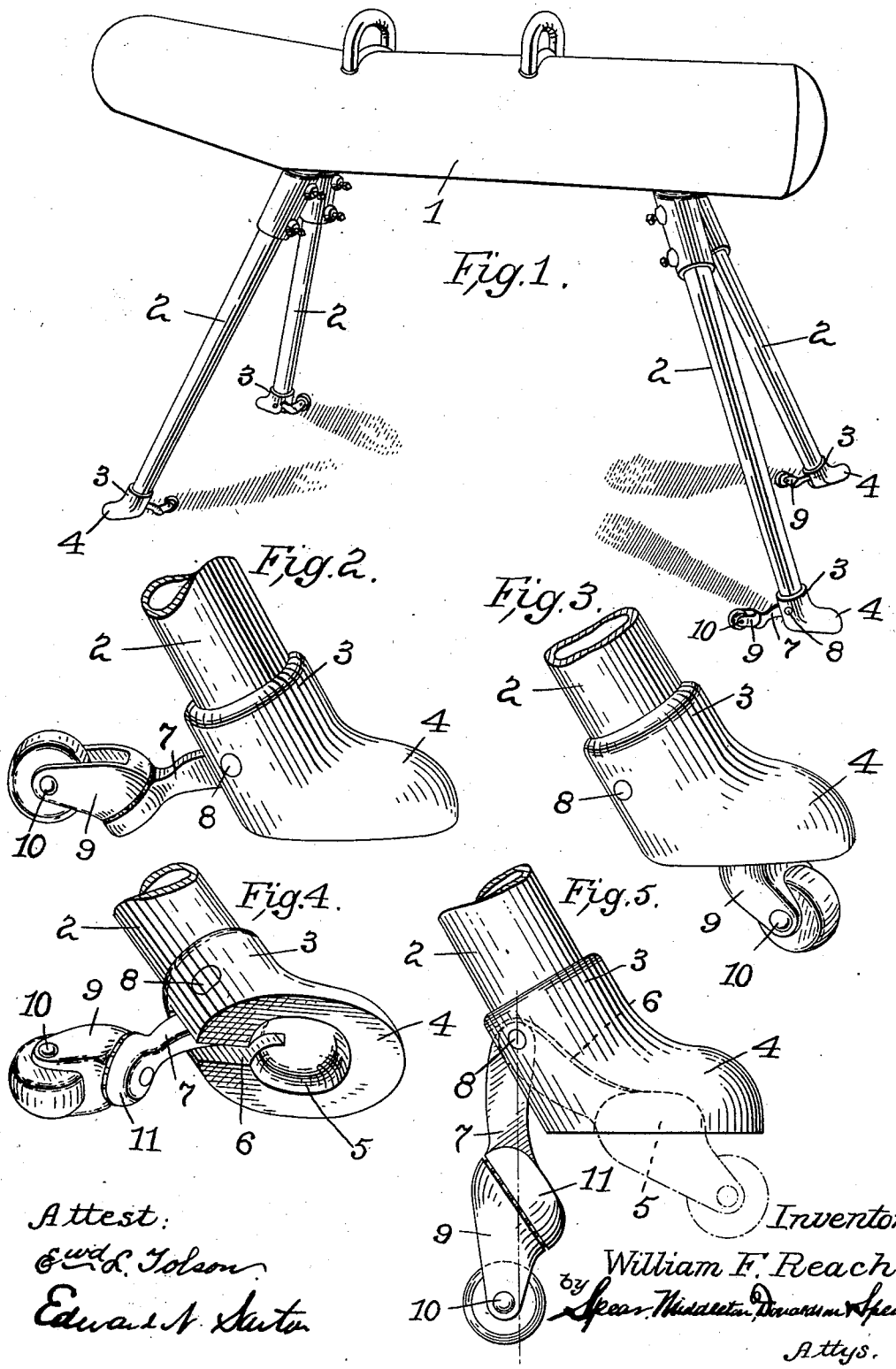

WILLIAM F. REACH, OF SPRINGFIELD, MASSACHUSETTS, ASSIGNOR TO A. G. SPALDING & BROS. MANF'G CO., A CORPORATION OF MASSACHUSETTS.

GYMNASIUM-CASTER.

999,184.  Specification of Letters Patent.  Patented July 25, 1911.

Application filed April 28, 1911.  Serial No. 623,949.

*To all whom it may concern:*

Be it known that I, WILLIAM F. REACH, a citizen of the United States, residing at Springfield, Massachusetts, have invented certain new and useful Improvements in Gymnasium-Casters, of which the following is a specification.

My invention relates particularly to gymnasium apparatus, and as an instance of its application in the drawings I would refer to its use in connection with a vaulting horse or buck.

One object of my invention is to provide a caster which, when the apparatus is in use on the floor, will be out of service so that the supports or legs of the apparatus will rest firmly upon the floor, but when the apparatus is to be moved the casters can be brought into use by simply raising the apparatus at first one end and then the other, whereupon the casters will swing from their position of non-use and thereupon, by lowering the apparatus, the casters will be caught in proper position for use in moving the horse or other apparatus about the floor.

The invention consists in the features and combination and arrangement of parts hereinafter described and particularly set forth in the appended claims.

In the accompanying drawings Figure 1 is a perspective view of a vaulting horse with my invention in place; Fig. 2 is a perspective view of one of the feet or legs with the caster in the position of non-use; Fig. 3 is a similar view to Fig. 2 with the caster in active position; and Fig. 4 is a perspective view showing the bottom of the foot or leg and the socket therein adapted to receive the caster bracket. Fig. 5 is a side view.

In these drawings, 1 indicates a vaulting horse, this being representative of any gymnasium apparatus such as a buck to which my invention may be applied. It is supported upon legs 2, there being four of these, the front pair inclining forwardly and the rear pair inclining rearwardly, and the members of each pair diverging or inclining laterally. Each leg is provided with a foot piece 3 secured thereto in any suitable manner, said foot being extended, as at 4, to present on its under side a supporting surface of considerable extent, and as shown in Fig. 4, on the under side of this foot a recess or socket is formed, as at 5, and connecting with this socket is a slot or recess 6 extending through to the edge of the foot and upwardly at the inner side thereof. In the slot or recess 6 is pivoted the arm 7 of the caster bracket, the pivot being shown at 8, and to this arm the frame or bracket 9 is swiveled in which the caster roller or wheel is journaled at 10. The arm or bracket 7 is enlarged at 11, where it receives the swivel pin of the caster, and this enlargement is adapted to seat itself in the recess 5 when the caster arm is turned from the position shown in Figs. 2 and 4 to that shown in Fig. 3. Fig. 2 represents the position of the caster when the apparatus is in position on the floor, at which time the foot 3 rests firmly upon the floor to hold the apparatus against movement in any direction. In order to adjust the caster from its position of non-use, as in Figs. 2 and 4, to its active position shown in Fig. 3, it is simply necessary to raise the horse quickly at one end so that the casters, by this movement, will swing downwardly and forwardly, and then by immediately lowering this raised end of the horse the casters will be caught in their newly assumed positions with the result that the apparatus will be supported on these casters as shown in Fig. 3. At this time the weight of the apparatus will be taken off of the caster arm 7 and its pivot 8, and will be borne by the enlargement 11 and the bracket 9, the said enlargement resting in the socket 5 and being securely held thereby against movement in any horizontal direction.

It will be understood that the quick movement for lifting of the horse need not be such as to throw the caster completely into its active position, but only enough to get the caster beyond the vertical plane of the pivot because upon lowering this elevated end of the horse the weight will cause the caster to assume the position shown in Fig. 3. The construction of the bracket and the relation of the caster wheel thereto is such that the center of gravity is slightly to one side of the vertical plane of the journal of the caster wheel, so that should the horse be raised slowly while the caster is in the position of Fig. 5, gravitation will cause the caster wheel to assume such a position in relation to the pivot 8 that upon lowering the horse the weight will carry the caster bracket to the position of Fig. 1.

It will be observed that with my invention the casters can be thrown into active position by slightly raising first one end of the horse or other apparatus and then the other. While I have described that the caster has its center of gravity so placed that it will assume the position of Fig. 5 when the horse is raised slowly, and that the caster will therefore be thrown to inactive position when the horse is lowered, the arrangement may be the reverse of this so that the center of the caster wheel will lie to the right of the vertical plane of the pivot 8, when it is allowed to lower slowly into its pendent position whereby when the horse is raised slowly and then lowered, the caster will move under the hoof and its frame will rest in the socket thereof.

I claim as my invention:—

1. In apparatus of the class described, a leg or support therefor, an arm pivoted to the leg and having an end to engage the under side of the said leg to support the same, a bracket swiveled to the end of the arm and extending downwardly from the lower side of said end, and a caster wheel carried by the bracket at the lower end thereof, the said arm with the bracket and caster wheel being free to swing by gravity from a position under the leg or from its inactive position at one side of the leg, substantially as described.

2. In apparatus of the class described, a leg or support having a socket in its lower face, a caster wheel, and a support for the wheel pivotally mounted on the leg or support and having a portion to enter the socket which portion within the socket sustains the weight and relieves the pivot when the caster is in active position, substantially as described.

3. In apparatus of the class described, a leg or support having a socket in its under face, a slot extending laterally therefrom, a caster wheel and a bracket carrying the same, pivotally mounted in the slot and having a portion to enter the socket, substantially as described.

4. In combination, a foot having its lower face to rest on the floor, and a leg extending up from the foot at an inclination to said lower face, an arm pivoted to the rear or inclined inner side of the leg and having a portion to fit under the lower surface of the foot with a caster swiveled to said portion, substantially as described.

In testimony whereof, I affix my signature in presence of two witnesses.

WILLIAM F. REACH.

Witnesses:
J. F. MOORE,
CLARENCE H. ARCHER.

---

Copies of this patent may be obtained for five cents each, by addressing the "Commissioner of Patents, Washington, D. C."